United States Patent [19]

Petersen et al.

[11] 4,220,751
[45] Sep. 2, 1980

[54] PREPARATION OF SOFT AND HARD RESINS, AND THEIR USE

[75] Inventors: Harro Petersen, Frankenthal; Kurt Fischer, Ludwigshafen; Hans Klug, Mutterstadt; Werner Trimborn, Limburgerhof, all of Fed. Rep. of Germany

[73] Assignee: BASF Aktiengesellschaft, Fed. Rep. of Germany

[21] Appl. No.: 969,664

[22] Filed: Dec. 15, 1978

[30] Foreign Application Priority Data

Dec. 22, 1977 [DE] Fed. Rep. of Germany ....... 2757176

[51] Int. Cl.² ............................................. C08G 12/12
[52] U.S. Cl. .................... 528/232; 528/259; 528/264; 528/488
[58] Field of Search ............... 528/231, 232, 259, 264, 528/488

[56] References Cited

U.S. PATENT DOCUMENTS

| | | | |
|---|---|---|---|
| 2,124,151 | 7/1938 | Rothrock | 528/259 |
| 2,572,256 | 10/1951 | Garner et al. | 528/232 X |
| 4,102,840 | 7/1978 | Pusch | 528/261 X |

FOREIGN PATENT DOCUMENTS

1230805 12/1966 Fed. Rep. of Germany ........... 528/259
1670153 7/1970 Fed. Rep. of Germany ........... 528/259

OTHER PUBLICATIONS

Petersen, H., Angewanote Chemie, 76 (1964), pp. 909–919.

*Primary Examiner*—Lucille M. Phynes
*Attorney, Agent, or Firm*—Keil & Witherspoon

[57] ABSTRACT

A process for the preparation of soft and hard resins, and their use in surface-coating binders.

According to the invention, soft and hard resins are prepared from a urea and a CH-acidic aldehyde by reacting a urea of the general formula (I)

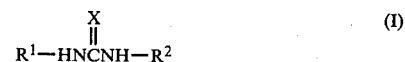

(I)

where X is oxygen or sulfur and $R^1$ and $R^2$ are hydrogen or identical or different alkyl, aryl or aralkyl, or may be an alkyleneurea radical, with at least 2 moles of a CH-acidic aldehyde of the general formula (II)

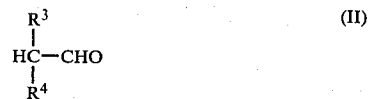

(II)

where $R^3$ is hydrogen and $R^4$ is alkyl, aryl or aralkyl, or $R^3$ and $R^4$ are identical or different alkyl, aryl or aralkyl, in the presence of a strong acid, to give a condensation product, and then treating the latter with a base in an anhydrous medium.

These soft and hard resins are used, in combination with other film-forming agents, as surface-coating binders.

9 Claims, No Drawings

PREPARATION OF SOFT AND HARD RESINS, AND THEIR USE

The present invention relates to a process for the preparation of soft and hard resins from a urea and a CH-acidic aldehyde, and to their use.

It is known from German Pat. No. 1,230,805 and from publications by H. Petersen in Angewandte Chemie 76 (1964), 909–919 and in Synthesis 1973, 243–292, that a urea of the general formula (I)

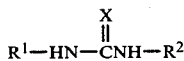

where X is O or S and $R^1$ and $R^2$ are hydrogen or alkyl, may be reacted with 2 moles of a CH-acidic aldehyde of the general formula (II)

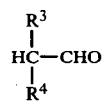

where $R^3$ and $R^4$ are hydrogen or identical or different alkyl, under strongly acid condensation conditions, to give a hexahydropyrimidine of the general formula (III)

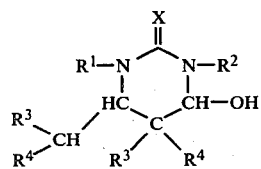

The heterocyclic compounds (III) are crystalline compounds. It is also known from German Pat. No. 1,670,153 that a compound of the type of (III) may be reacted with a further mole of a CH-acidic aldehyde of the general formula (II) under acid condensation conditions to give a hexahydropyrimidine-aldehyde of the general formula (IV).

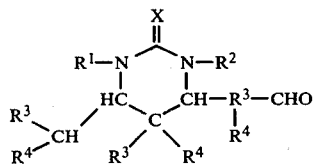

The compounds (IV) can be recrystallized or distilled. They do not have the character of a soft or hard resin. On standing, and especially on exposure to light, compounds of type (IV) eliminate carbon monoxide, and must therefore be handled cautiously.

It is an object of the present invention to provide a process which permits the preparation of advantageous hard and soft resins.

We have found, surprisingly, that the condensation of urea or thiourea and of their monosubstituted derivatives, and in some cases also their symmetrically disubstituted derivatives, with CH-acidic aldehydes of the general formula (II) in the molar ratio of from 1:2 to 1:>2 under acid conditions gives condensation products which on after-treatment with alkali metal alcoholates in an anhydrous medium give soft and hard resins.

Accordingly, the present invention relates to a process for the preparation of soft and hard resins from urea and a CH-acidic aldehyde, by reacting a urea of the general formula (I)

where X is oxygen or sulfur and $R^1$ and $R^2$ are hydrogen or identical or different alkyl, aryl or aralkyl, or may be an alkyleneurea radical, with at least 2 moles of a CH-acidic aldehyde of the general formula (II)

where $R^3$ is hydrogen and $R^4$ is alkyl, aryl or aralkyl, or $R^3$ and $R^4$ are identical or different alkyl, aryl or aralkyl, in the presence of a strong acid, to give a condensation product, wherein the said product is then treated with a base in an anhydrous medium.

In a preferred embodiment of the process according to the invention, the base used for the after-treatment is an alkali metal alcoholate and the reaction is carried out in the presence of an aromatic hydrocarbon.

The present invention further relates to the use of the soft and hard resins prepared according to the invention, in combination with other film-forming agents, as surface-coating binders.

The soft and hard resins according to the invention have softening points of from about 50° to 150° C. In combination with other film-forming agents they may be used, for example, for the production of wood varnishes, paper varnishes and anti-corrosion finishes.

The following details may be noted in respect of the components from which the resins prepared according to the invention are synthesized.

Suitable ureas of the general formula (I)

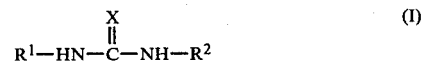

where X is oxygen or sulfur and $R^1$ and $R^2$ are hydrogen or identical or different alkyl, especially of 1 to 18 carbon atoms, aryl, especially of 6 to 9 carbon atoms, or aralkyl especially of 7 to 9 carbon atoms, or may be an alkyleneurea radical, where alkylene is of 1 to 9 carbon atoms, are urea, thiourea, monomethylurea, methylenediurea, stearylurea, symmetrical dimethylurea, propyleneurea and hexamethylenediurea, preferably urea, methylurea, methylenediurea and hexamethylenediurea.

CH-acidic aldehydes of the general formula (II)

are those where $R^3$ is hydrogen and $R^4$ is alkyl, especially of 1 to 10 carbon atoms, aryl, especially of 6 to 9 carbon atoms, or aralkyl, especially of 7 to 9 carbon atoms, or $R^3$ and $R^4$ are identical or different alkyl, especially of 1 to 10 carbon atoms, aryl, especially of 6 to 9 carbon atoms, or aralkyl, especially of 7 to 9 carbon atoms. For the purposes of the invention, CH-acidic aldehydes are those where the carbon adjacent to the carbonyl group carries one or two hydrogen atoms. CH-acidic aldehydes are those where the carbon adjacent to the carbonyl group carries one or two hydrogen atoms. Examples of suitable aldehydes are isobutyraldehyde, 2-methylpentanal, 2-ethylhexanal, phenylpropanal, isovaleraldehyde and n-butyraldehyde.

The urea and the CH-acidic aldehyde are in general employed in a molar ratio of from 1:2 to 1:8, preferably from 1:3 to 1:6.

The properties of the resins according to the invention, especially their softening points and compatibility with solvents, can be influenced in a controlled manner by varying the molar ratio. Hard resins are obtained with a molar ratio of urea to CH-acidic aldehyde of from 1:2 to 1:4. In contrast, soft resins are obtained with molar ratios of urea to CH-acidic aldehyde of 1:>4.

Suitable acids are inorganic and organic acids, eg. oxalic acid, phthalic acid, and, preferably, sulfuric acid.

The process according to the invention is advantageously carried out in the presence of solvents and/or diluents. Suitable solvents are, in particular, aromatic hydrocarbons, eg. toluene and xylene.

The acid condensation is carried out at a temperature of from 70° to 150° C., preferably from 90° to 140° C., advantageously until no further water is eliminated. After completion of the acid condensation, the conventional procedure of neutralizing with a base, eg. sodium hydroxide solution or potassium hydroxide solution, and removing the residual water by azeotropic distillation, is followed. The condensation product is then after-treated with a base, preferably an alkali metal alcoholate. For this purpose, a catalytic amount, for example from about 2 to 5% by weight, based on solid resin, of the base, eg. sodium ethylate or sodium methylate, is added and the treatment is carried out for from 1 to 2 hours at from 50° to 130° C., preferably from 80° to 120° C. The mixture is then neutralized with acid and washed with water. Finally, the solvent is distilled from the organic phase under reduced pressure.

Details of the reaction conditions can also be found in the Examples which follow. The resins may be manufactured batchwise or continuously.

The soft and hard resins prepared according to the process of the invention may be used, in combination with other physically drying film-forming agents conventionally used as surface-coating binders, such as cellulose derivatives, eg. nitrocellulose, ethylcellulose, cellulose acetobutyrate, chlorinated rubber, copolymers based on vinyl esters, vinyl chloride, acrylic esters or vinyl-aromatics, eg. vinyl chloride/vinyl isobutyl ether copolymers, or chemically drying binders, eg. alkyd resins, drying oils and semi-drying oils, for the production of surface coatings having good adhesion, hardness and light resistance. The content of resin prepared according to the invention in these surface coatings can be varied within wide limits but is in most cases not more than 50% by weight, preferably from 2 to 40% by weight, of the total binder.

The surface-coating binders according to the invention can be processed using the solvents and diluents conventionally employed in surface coating, such as alcohols, ketones, ethers, esters and aliphatic and aromatic hydrocarbons, eg. toluene, xylene, hexane, white spirit or mixtures of the above solvents, as well as pigments, dyes, plasticizers, flow control agents and other assistants.

The surface-coating binders of the invention may be employed for finishing substrates such as wood, chipboard, paper and metal, using conventional methods of application, eg. brushing, spraying or casting.

The novel products have very advantageous processing characteristics. They give surface coatings having very good mechanical properties, good gloss, good light resistance and good water resistance.

The surface-coating binders of the invention may, for example, be used very advantageously for the production of wood varnishes, paper varnishes and anti-corrosion finishes.

In the Examples, parts and percentages are by weight.

EXAMPLE 1

Urea-isobutyraldehyde (molar ratio 1:2) Resin

A mixture of 576 parts of isobutyraldehyde, 800 parts of xylene and 240 parts of urea is heated to the boil in a stirred flask equipped with a condenser, water separator, thermometer and dropping funnel, and 50 parts of 75% strength sulfuric acid are added over 5 minutes. The reaction mixture is refluxed for 3 hours, during which the temperature rises to 130° C. The water formed (133 parts) is removed via the water separator. The mixture is then brought to pH 8-9 with 50% strength sodium hydroxide solution and more water is removed until the temperature reaches 136°-138° C.

60 Parts of 30% strength sodium methylate in methanol are then added to the contents of the flask, and the batch is refluxed for 1 hour.

It is then neutralized with about 20 parts of 75% strength sulfuric acid and washed with 1,000 parts of water at 80° C. After removing the wash water, the xylene is distilled from the xylene phase under reduced pressure until the temperature in the flask reaches 180° C.

595 Parts of a pale, alcohol-soluble resin having a softening point of 146° C. (KSN) are obtained.

EXAMPLE 2

Urea-isobutyraldehyde (molar ratio 1:3) Resin

864 Parts of isobutyraldehyde, 800 parts of xylene and 240 parts of urea are mixed, and heated to the boil, in a stirred flask equipped with a condenser, water separator, thermometer and dropping funnel. 50 Parts of 75% strength sulfuric acid are added dropwise in the course of about 10 minutes and the mixture is then stirred for 5 hours at the boil. The resulting water (158 parts) is removed via the water separator. During the condensation reaction, the temperature rises to 123°-125° C. The mixture is then cooled to 80° C. and neutralized with about 50 parts of 50% strength sodium hydroxide solution, and further water is removed at the boil until the temperature reaches 132°-135° C. 60 Parts of 30% strength sodium methylate solution in methanol are then added to the contents of the flask, which are stirred for 1 hour at the boil (112°-115° C.). The mixture is then cooled to 60° C., neutralized with 75% strength sulfuric acid and washed with 1,000 parts of water at 80° C. After separating off the wash water, the solvent is distilled from the xylene phase under reduced pressure (20-25 mm Hg), the temperature in the flask being 175° C.

The residue obtained consists of 825 parts of a pale hard resin having the following characteristics:

KSN softening point: about 120° C.
acid number (DIN 53,402): <5
color number, measured on a 50% strength solution in xylene: <5
non-volatiles (2 hours at 125° C.): <98%

The product is satisfactorily soluble in white spirit (boiling range 155°–185° C.) and xylene. It is partially soluble in toluene, alcohols (e.g. ethanol and butanol) and esters (eg. ethyl acetate and butyl acetate).

The product is fully compatible with film-forming agents such as nitrocellulose, ethylcellulose, cellulose acetobutyrate, vinyl chloride copolymers (e.g. ®Laroflex MP), chlorinated rubber, linseed oil/stand oil and numerous alkyd resins, as well as with plasticizers (e.g. dibutyl phthalate and dioctyl phthalate) and castor oil.

USE EXAMPLES (a) Alkyd Resin Finish for Industrial Surface Coatings 48 parts by weight of an alkyd resin (containing about 48% of drying vegetable fatty acids), as a 55% strength solution in a xylene/white spirit mixture,
13.2 parts by weight of a urea-isobutyraldehyde resin (as described in Example 2), as a 50% strength solution in white spirit,
0.5 part by weight of silicone oil A, as a 10% strength solution in xylene,
3 parts by weight of montmorillonite (e.g. Bentone 34) 10% strength slurry in xylene,
0.5 part by weight of an anti-skin agent based on an oxime, eg. ®Luactin, conc.,
30.0 parts by weight of titanium dioxide (rutile),
5.0 parts by weight of turpentine oil,
5.0 parts by weight of xylene and
1.0 part by weight of a 50% strength solution of a dryer (Co, Pb, Mn naphthenate) in xylene.

The finish was brought to a viscosity suitable for application (by spraying or brushing) with xylene. Applied to give a dry film thickness of about 30μ, the product gave fast-drying, firmly-adhering and elastic coatings on sheet steel.

(b) Nitrocellulose Finish for Wood and Metal 9.0 parts by weight of medium-viscosity, ester-soluble nitrocellulose, 2:1 butanol-moist (nitrocellulose:butanol=2:1),
11.0 parts by weight of an alkyd resin (containing 25% of synthetic fatty acids), as a 60% strength solution in xylene,
2.0 parts by weight of dioctyl phthalate,
6.0 parts by weight of a urea-isobutyraldehyde resin (as described in Example 2), as a 50% strength solution in ethyl acetate,
0.2 part by weight of soybean lecithin,
12.0 parts by weight of titanium dioxide (rutile),
19.0 parts by weight of butyl acetate,
5.0 parts by weight of ethylglycol,
5.0 parts by weight of butanol,
10.0 parts by weight of xylene and
20.8 parts by weight of ethyl acetate.
Total: 100.0 parts by weight
Solids content: about 29.5%
4 mm cup efflux time (DIN 53,211): about 20″

The finish was applied with a spray gun.

On iron, firmly-adhering, hard surface coatings were obtained.

(c) Nitrocellulose Paper Varnish 15.0 parts by weight of medium-viscosity, ester-soluble nitrocellulose, butanol-moist (nitrocellulose:butanol=2:1),
10.0 parts by weight of a urea-isobutyraldehyde resin (as described in Example 2),
6.0 parts by weight of dioctyl phthalate,
20.0 parts by weight of ethanol,
20.0 parts by weight of ethyl acetate,
28.8 parts by weight of butyl acetate and
0.2 part by weight of a 10% strength silicone oil solution in toluene.
Total: 100.0 parts by weight.
Solids content: about 26%
4 mm cup efflux time (DIN 53,211): about 20″

On applying about 4 g/m² to art printing paper, hard, glossy, light-resistant surface coatings were obtained.

EXAMPLE 3

Urea-isobutyraldehyde (molar ratio 1:4.25) Resin 1,224 Parts of isobutyraldehyde, 800 parts of xylene and 240 parts of urea are mixed in a stirred flask equipped with a condenser, water separator, thermometer and dropping funnel, and are heated to the boil. 100 Parts of 75% strength sulfuric acid are run in from the dropping funnel in the course of 10 minutes. The reaction mixture is stirred for 5 hours at the boil, during which the temperature rises from 72° to 94° C. The water formed (175 parts) is removed via the water separator.

The mixture is then brought to pH 8–9 with 50% strength sodium hydroxide solution and further water is removed. After about 2 hours, the removal of water is complete. 120 Parts of 30% strength sodium methylate solution are then added to the reaction mixture and the latter is stirred at the boil (100°–105° C.) for 1 hour.

It is then cooled to 60° C., neutralized to pH 7 with 75% strength sulfuric acid and washed with 1,000 parts of water. After removing the wash water, the xylene is distilled from the organic phase under reduced pressure (20 mm Hg) until the internal temperature reaches 175° C. 1,040 parts of a pale resin are obtained; this gives a clear solution in alcohol and white spirit and has a KSN softening point of 95°–100° C.

EXAMPLE 4

Urea-isobutyraldehyde (molar ratio 1:8) Resin 1,152 Parts of isobutyraldehyde, 800 parts of xylene and 120 parts of urea are mixed in a stirred apparatus like that described in Example 1, and the mixture is heated to the boil. 50 Parts of 75% strength sulfuric acid are added dropwise in the course of 10 minutes and the mixture is then stirred for 5 hours at the boil. The water formed (89 parts) is removed via the water separator. The mixture is then neutralized with 50% strength sodium hydroxide solution and further water is removed until the temperature reaches about 90° C. 60 Parts of 30% strength sodium methylate in methanol are then added to the reaction solution, which is stirred at the boil for 1 hour.

The solution is then cooled to 60° C. and is neutralized to pH 7 with 75% strength sulfuric acid and washed with 1,000 parts of water at 60°–70° C. After removing the wash water, the solvent is distilled from the organic phase under reduced pressure, until the temperature in the flask reaches 170°–175° C.

The residue obtained consists of 800 parts of a pale soft resin which gives a clear solution in alcohol and white spirit.

EXAMPLE 5

Urea/n-butyraldehyde (molar ratio 1:4.25) Resin

612 Parts of n-butyraldehyde, 400 parts of xylene and 120 parts of urea are heated to the boil in a stirred apparatus of the type described in Example 1, and 50 parts of 75% strength sulfuric acid are added cautiously. The mixture is boiled under reflux and the resulting water (128 parts) is removed via the water separator. After about 4 hours, the elimination of water is complete. The mixture is then neutralized with 50% strength sodium hydroxide solution and is stirred for a further 2 hours at the boil, whilst removing water.

60 parts of 30% strength sodium methylate in methanol are then added to the reaction solution and the mixture is stirred for 1 hour at the boil, and when it has cooled to 60° C. is neutralized with 75% strength sulfuric acid.

The further working up takes place as described in Example 3. 480 Parts of a soft resin which is readily soluble in alcohol and in white spirit are obtained.

EXAMPLE 6

Urea/2-methylpentanal (molar ratio 1:4) Resin

A mixture of 800 parts of 2-methylpentanal, 800 parts of xylene and 120 parts of urea is heated to the boil in a stirred apparatus of the type described in Example 1, and 50 parts of 75% strength sulfuric acid are added dropwise. The mixture is then stirred at the boil and the water formed (84 parts) is removed via the water separator. The condensation is complete after about 3 hours. The reaction mixture is neutralized with 50% strength sodium hydroxide solution and stirred for a further hour at the boil, whilst removing water. 60 Parts of 30% strength sodium methylate solution in methanol are then added to the contents of the flask and the mixture is again stirred for 1 hour at the boil. It is then cooled to 60° C., neutralized to pH 7 with 75% strength sulfuric acid and washed with twice 1,000 parts of water. After removing the wash water, the xylene solution is evaporated under reduced pressure (20–25 mm Hg) until the temperature in the flask reaches 175° C.

450 Parts of a pale brown resin, which gives a clear solution in alcohol and white spirit and has a KSN softening point of 68° C., are obtained.

EXAMPLE 7

Nonanediurea/isobutyraldehyde (molar ratio 1:6.25) resin

A mixture of 244 parts of nonanediurea, 450 parts of isobutyraldehyde and 800 parts of xylene is heated to the reflux temperature whilst stirring, and 50 parts of 75% strength sulfuric acid are then added in the course of 10 minutes. The reaction mixture is stirred for 2 hours at the boil and the resulting water (109 parts) is removed via a water separator. During this time the temperature rises from 70° to 105° C.

The mixture is then cooled to 80° C., neutralized with 50% strength sodium hydroxide solution and stirred for a further hour at the boil, whilst removing water.

60 Parts of a 30% strength sodium methylate solution in methanol are then added dropwise to the reaction mixture and the batch is refluxed for 1 hour. It is then cooled to 60° C., neutralized with 75% strength sulfuric acid and washed with twice 1,000 parts of water at 80° C. After separating off the wash water, the xylene is distilled from the organic phase under reduced pressure (20 mm Hg) until the temperature in the flask reaches 175° C.

The residue obtained consists of 460 parts of a pale yellow resin having a KSN softening point of 65° C.

We claim:

1. A process for the preparation of soft and hard resins from an urea and a CH-acidic aldehyde, which consists essentially of reacting an urea of the formula (I)

where X is oxygen or sulfur and $R^1$ and $R^2$ are hydrogen, identical or different alkyl of 1 to 18 carbon atoms, aryl of 6 to 9 carbon atoms or aralkyl of 7 to 9 carbon atoms or may be an alkyleneurea radical, where alkylene is of 1 to 9 carbon atoms, with at least 2 moles of a CH-acidic aldehyde of the formula (II)

where $R^3$ is hydrogen and $R^4$ is alkyl, aryl or aralkyl, or $R^3$ and $R^4$ are identical or different alkyl, aryl or aralkyl, in the presence of a strong acid, to give a condensation product, and thereafter treating the product with an alkali metal alcoholate in an anhydrous medium.

2. The process of claim 1, wherein $R^3$ and $R^4$ in the general formula (II) of the CH-acidic aldehyde are identical or different alkyl of 1 to 10 carbon atoms, aryl of 6 to 9 carbon atoms or aralkyl of 7 to 9 carbon atoms.

3. The process of claim 1, wherein the urea and the CH-acidic aldehyde are employed in a molar ratio of from 1:2 to 1:8.

4. The process of claim 1, wherein the urea and the CH-acidic aldehyde are employed in a molar ratio of from 1:3 to 1:6.

5. The process of claim 1, wherein the CH-acidic aldehyde employed is one or more aldehydes selected from the group comprising isobutyraldehyde, 2-methylpentanal, 2-ethylhexanal, phenylpropanal, isovaleraldehyde and n-butyraldehyde.

6. The process of claim 1, wherein the reaction is carried out in the presence of an aromatic hydrocarbon.

7. The process of claim 1, wherein the base employed for the after-treatment is sodium methylate or sodium ethylate.

8. The process of claim 1, wherein the after-treatment with a base is carried out at from 50° to 130° C.

9. A surface-coating binder, which comprises a mixture of from 60 to 98 percent by weight of conventional physically drying or chemically drying binders and from 40 to 2 percent by weight of a soft or hard resin prepared by the process of claim 1.

* * * * *